Patented Apr. 24, 1951

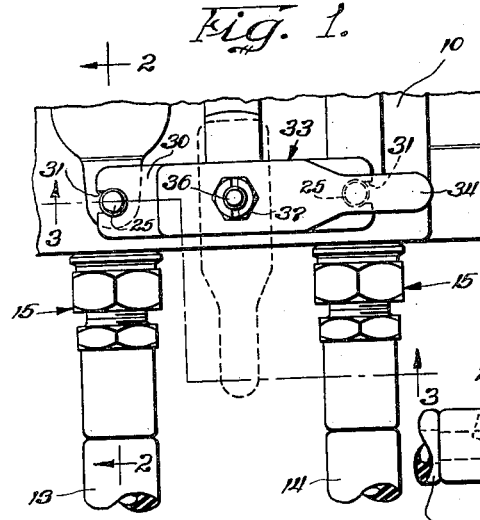
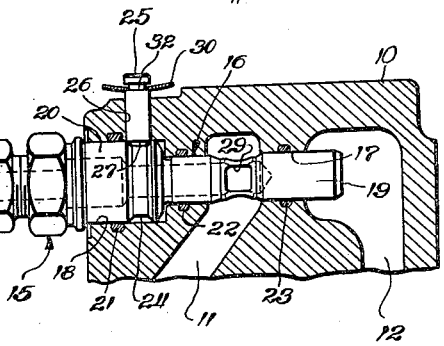

2,549,791

UNITED STATES PATENT OFFICE 2,549,791

FLUID LINE COUPLING

Edward H. Fletcher, Waterloo, Iowa, assignor to Deere Manufacturing Co., Dubuque, Iowa, a corporation of Iowa Application February 9, 1949, Serial No. 75,385

10 Claims. (Cl. 285—96.3)

This invention relates to a hydraulic system or the like and more particularly to improved means for connecting or coupling a fluid line, such as a hose or similar conduit, to the hydraulic circuit for transmitting fluid under pressure to a point remote from the source of fluid pressure.

Systems of the general type referred to are relatively common in the use of agricultural machinery, particularly in connection with the use of a tractor and an implement or machine connected to the tractor. The tractor is ordinarily furnished with a hydraulic control system which includes a distributing valve. This valve may be provided with one or more ports to which one or more fluid conduits may be connected for the purposes of transmitting fluid under pressure to a cylinder mounted on the implement or other machine used with the tractor. This cylinder is useful for the purposes of raising, lowering, or otherwise adjusting implement or machine parts.

It is desired in the use of a system of this type that the cylinder be disconnectible from the distributing valve or main fluid pressure system for at least two basic reasons: (1) It may be desirable to leave the cylinder on the implement or machine when the tractor is disconnected therefrom; or (2) provision must be made for disconnection of the fluid conduits in the event that the implement or machine is connected to the tractor by hitch means of the type releasable in response to an excessive force applied to the draft connection, such as may occur when the implement or machine strikes a relatively large obstruction in the field.

In one prior construction heretofore known, the connection between the distributing valve port and the fluid line was accomplished by means including a frangible washer, which washer would shear in response to the application of excessive force to the hose lines. A system of the general type referred to which uses a coupling of the frangible washer type is disclosed in assignee's co-pending application, Serial No. 626,626, filed November 5, 1945, now Patent No. 2,532,552.

An improved coupling means is disclosed in assignee's co-pending application, Serial No. 11,504, filed February 27, 1948, wherein one of the characteristics is that the fluid pressure on the coupling is balanced and a relatively lightly loaded detent is provided in place of frangible washers. The present invention provides for a still further improvement in the coupling means last referred to and specifically provides an improved means for controlling the detent.

Primarily, the construction involved in the present invention utilizes a spring which is normally loaded to keep the detent out of engagement so that the coupling may be readily removed by hand. However, there is provided in addition a movable control member or handle which reversely loads the spring so as to resiliently urge the detent into engagement with the coupling. The control of the spring by the means for reversely loading the same is such that the spring is left with sufficient resiliency to permit disengagement of the detent in response to the application of excessive tensional forces on the hose line to which the coupling is connected.

Another object of the invention is to provide an improved control means which is inexpensive in construction and is trouble-free in operation, thereby encouraging its use by the operator and thus eliminating many of the vexatious problems ordinarily encountered in the use of remotely controlled hydraulic systems in the agricultural machinery field.

The foregoing and other important objects and desirable features inherent in and encompassed by the present invention will become apparent to those skilled in the art as the disclosure is completely made in the following detailed description and accompanying sheet of drawings in which Figure 1 is a fragmentary plan view of a portion of a distributing valve shown in connection with a pair of couplings for fluid conduits and including a preferred embodiment of the control means;

Figure 2 is a sectional view taken on the line 2—2 of Figure 1;

Figure 3 is a transverse sectional view taken substantially on the line 3—3 of Figure 1, with the control means effective to maintain resilient engagement of the detent with the couplings;

Figure 4 is a view similar to that in Figure 3, with the control member moved to released position; and Figure 5 is a sectional view similar to Figure 2 but showing a plug replacing the coupling in the distributing valve.

Since hydraulic control systems for agricultural machinery are well known and further since the various forms thereof are governed usually by individual desires, an entire system has not been illustrated in the present instant. However, the disclosure includes such fragmentary portions as are necessary to facilitate a complete understanding of the invention.

In the drawings, the numeral 10 designates a housing which is part of a distributing valve. As shown in Figures 2 and 5, the housing 10 is internally cored at 11 and 12. The passage provided at 11 is a high-pressure passage for the transmission of fluid under pressure in those cases in which a cylinder is located at a point remote from the distributing valve. The passage 12 is utilized for the purposes of transmitting fluid under pressure to a so-called integral cylinder, which is a cylinder forming a closely related part of the control system on the tractor. For the purposes of the present disclosure, further reference need not be had to the passage 12, the means being illustrated merely because it is a part of the proximate portion of the distributing valve housing 10.

Further, as a matter of fact, there are two passages 11 spaced apart in the housing 10, one for each of two fluid conduits or hoses 13 and 14. However, since the relationship of passage 11 to its respective conduit is identical in each case the description of one will suffice for the other.

The illustrated passage 11 communicates with the hose 13 via a coupling 15 and a bore or port 16. The other hose 14 is similarly associated with the corresponding but not illustrated high-pressure passage. Since the couplings 15 are identical, both are given the same reference characters and the detailed description of one will apply to the other.

The bore or port includes a first bore portion 17 of relatively small diameter which intersects the high-pressure passage 11. This bore portion continues into an enlarged counterbore portion 18 which opens outwardly at the rear face of the housing 10. The coupling 15 includes an elongated shank portion 19 which is axially receivable by the bore portion 17, and further includes an enlarged cylindrical portion 20 which is received by the counterbore 18. Suitable sealing means are provided at 21, 22 and 23 to prevent the escape of hydraulic fluid. The enlarged portion 20 of the coupling is provided with an annular groove 24 which thus provides a pocket or recess for association with a detent or plunger 25 slidably carried in a bore 26 which is normal to the axis of the bore 16. The lower portion of the detent 25 is chamfered at 27 and the annular walls defining the recess or pocket 24 are correspondingly inclined, thus eliminating the possibility that the coupling will be positively and non-removably engaged by the detent.

Each coupling is drilled axially at 28 to provide a fluid-transmitting passage. A portion of the wall of the coupling within the high-pressure passage 11 is cut out, as at 29, to permit the free transfer of fluid between the passage 11 and the passage 28. It will be understood that in the instance of the two hoses 13 and 14 shown, these hoses are connected to opposite ends of a fluid cylinder (not shown), and that one hose is a pressure line and the other is a return line, in which case one of the passages 11 is a high-pressure passage and the other is an exhaust passage. In the instance in which only a single hose would be used, such as in a case in which the fluid cylinder is of the one-way type, the single hose would constitute both a pressure and a return line and only one of the passages 11 would be used. These details are merely incidental and are too well understood by those skilled in the art to require further elaboration.

The control means for the pair of detents 25 comprises resilient means in the form of a flat spring 30 which is notched or slotted at 31 at each of its opposite end portions, each portion respectively engaging the detent 25 via grooves 32 provided in the latter. The spring when installed is bowed or otherwise loaded to assume the position shown in Figure 4, being engaged at each of its opposite ends with the detent 25 in the manner aforesaid and being mounted intermediate its ends on the support provided by the housing 10 by operating means designated generally by the numeral 33. This means includes an operating handle 34 which is apertured at 35 to receive a pivot or stud 36, the upper end of which is threaded to receive securing means in the form of a nut 37. The lower portion of the stud may be threaded or otherwise provided to be securely mounted in a portion of the support or housing 10 midway between the detents 25, the axis of the pivot stud 36 being parallel to the axes of the detent bores 26. The spring 30 is mounted in place between the operating handle 34 and the intermediate portion of the support 10 by virtue of its having an aperture 38 therein through which the stud 36 passes.

The operating handle 34 is capable of being turned to either of two positions, both of which are illustrated in Figure 1. The securing or locking position is shown in full lines and the relieving or release position is shown in dotted lines. The control means further includes means for varying the effectiveness of the spring 30 to the end that the normal tensioning thereof is relieved and a reverse tension or loading is applied. This means takes the form of a cam 39 provided on the undersurface portion of the handle 34 surrounding the pivot stud 36 and above the intermediate portion of the spring 30. When the handle 34 is in its relieved or release position as shown in dotted lines in Figure 1 and in full lines in Figure 4, the cam is effective to permit the spring to retain its normal characteristics. That is, the spring is bowed in such manner that its intermediate portion rests on the intermediate portion of the housing 10 and its outer end portions are elevated above the housing so as to withdraw the detents 25 from the annular grooves 24 in the couplings 15. When the handle is turned to the full line position of Figure 1 or the position of Figure 3, the elongation of the longitudinal dimension of the cam 39 as respects its transverse dimension provides on the handle means for depressing portions of the spring 30 intermediate the aperture 38 and the opposite end portions which engage the detents 25. The operating means therefore tends to straighten the spring and to reversely load the same so that the tendency of the outer end portions of the spring is to urge the detents 25 resiliently into engagement with the annular grooves 24 in the couplings 15.

The resiliency in the portion at each end of the spring between the end of the cam 39 and the associated detent 25 is such as to permit upward movement of the detent 25 out of engagement with the associated coupling in the event that an excessive tensional force is applied to the associated hose. The equipment furnished with the system including the control means will be operated with the parts in the position illustrated in Figure 3; that is, with the couplings 15 resiliently held in place by the detents 25, the latter being capable of yielding for the purposes aforesaid. In the event that the operator desires to remove these couplings, he may do so by turning the handle member 34 to the dotted line position of Figure 1, whereby the normal or inherent resiliency in the spring 30 will move the detents 25 upwardly, thus freeing the lower portions of the detents from the coupling grooves.

In the event that the operator desires to operate the tractor without the implement to which is attached the cylinder that has the hoses 13 and 14, he replaces the couplings 15 with a pair of plugs or caps 40, one of which is indicated in Figure 5. This cap or plug is substantially identical to the coupling that it replaces, with the exception that it is imperforate so that fluid will not escape through the port 16. The plug 40 has an annular groove 41 which corresponds substantially to the annular groove 24 in the coupling 15, with the exception that the annular walls defining the groove 41 are not inclined, thereby providing for a positive engagement between the plug and the associated detent. The reason for the positive detent in the instance of the plug as distinguished from the instance of the coupling is that fluid pressure on the plug is not balanced, as it is in the coupling, the inner portion of the plug being partially drilled to provide a passage 42 and an opening 43 in the wall thereof to communicate with the passages 11 and 12. These details form no part of the present invention and are set forth merely by way of explanation. The plugs may be locked in place by the operator by means of his turning the handle 34 to the position of Figure 3. The plugs may be removed by a release of the handle 34, as in the case of the couplings 15.

The detailed description set forth above is of a preferred embodiment of the invention and is not intended to exclude variations and modifications that occur to those skilled in the art, all of which may be accomplished without departing from the spirit and scope of the invention as defined in the appended claims.

What is claimed is:

1. In a device of the class described including a pair of normally connected parts arranged for separation by movement of one part in a direction away from the other, the improvement residing in controllable detent means normally operable to hold the parts against separation except in the event of the application to one part of a separating force and releasable to provide for separation of the parts by force less than a separating force, said detent means comprising: a detent for one part; means providing a detent-receiving pocket in the other part; means carrying the detent on said one part for movement back and forth into and out of the pocket along a path at an angle to the direction of separation of the parts; spring means carried by one part and engaging the detent; and an operating handle pivoted on one part for movement between first and second positions and having cam means engaging the spring means in one position of the handle to load said spring means for yieldingly urging the detent into the pocket, said cam means being effective when the handle is in its second position to relieve the loading on said spring means.

2. In a device of the class described including a pair of normally connected parts arranged for separation by movement of one part in a direction away from the other, the improvement residing in controllable detent means normally operable to hold the parts against separation except in the event of the application to one part of a separating force and releasable to provide for separation of the parts by force less than a separating force, said detent means comprising: a detent for one part; means providing a detent-receiving pocket in the other part; means carrying the detent on said one part for movement in and out of the pocket in opposite directions into and out of the pocket along a path at an angle to the direction of separation of the parts; spring means carried by one part and engaging the detent and normally tensioned in one direction to urge the detent in one direction; and an operating handle pivoted on one part for movement between first and second positions and having cam means engaging the spring means in one position of the handle to overcome the aforesaid tension on the spring means and to load said spring means in the opposite direction for yieldingly urging the detent in the other direction, said cam means being effective when the handle is in its second position to relieve the opposite loading on said spring means so that the aforesaid normal tension in said spring means is effective.

3. The invention defined in claim 2, further characterized in that: the spring means comprises a flat spring having one portion thereof anchored at a point on one part spaced from the detent, and having another portion extending toward and engaging the detent; and the cam means is effective to operate on a portion of said flat spring intermediate the anchored portion thereof and the detent-engaging portion thereof.

4. In a device of the class described including a support having a bore into which and from which a coupling may be inserted and withdrawn, said support having a second bore normal to and intersecting the first bore and carrying a detent slidably therein for engagement with and disengagement from a recess in the coupling, the improvement residing in control means for the detent, comprising: a flat spring adapted to be secured to the support in spaced relation to the detent and extending generally normal to the path of sliding movement of the detent, said spring at one end being engageable with the detent and normally stressed to yieldably hold the detent out of the pocket in the coupling; means providing an aperture in the other end of the spring; and a movable operating member including means passing through the spring aperture for securing both the member and the spring to the support, said member further including means selectively effective upon movement of the member to load said spring oppositely to its normal stress for urging the detent into the coupling pocket, or to restore said spring to its aforesaid condition of normal stress.

5. The invention defined in claim 4, further characterized in that: the means passing through the spring aperture comprises a pivot element, and said selectively effective means comprises a cam angularly movable about said pivot element and engageable with a portion of the spring intermediate its ends.

6. The invention defined in claim 4, further characterized in that: the operating member is angularly movable about an axis paralleling the axis of the detent bore; the securing means includes a pivot; and the spring is mountable via said pivot and is further held against undesirable displacement by engagement with the detent.

7. In a device of the class described including a support having a pair of parallel spaced apart bores into each of which and from each of which a coupling may be inserted and withdrawn, said support having a pair of second bores, one normal to and intersecting one of the first bores and the other similarly arranged as respects the other of the first bores, and each carrying a detent slidably therein for engagement with and disengagement from a recess in the associated coupling, the improvement residing in control means for the detents, comprising: a flat spring having opposite end portions respectively engageable with the detents and normally bowed so as to yieldably urge the detents out of engagement with the coupling recesses, the intermediate portion of the spring having an aperture therein for mounting thereof on the support; and a movable operating member including means passing through the spring aperture for securing both the member and the spring to the support, said member further including means selectively effective upon movement of the member to tend to remove the bow in the spring by urging both end portions of the spring in the direction of coupling-engagement by the detents and consequently yieldably urging the detents into the coupling recesses, or to restore said spring to its aforesaid normal bowed condition.

8. The invention defined in claim 7, further characterized in that: the operating member includes a pivot on an axis parallel to the axes of the detent bores and said pivot passes through the spring aperture to mount both the spring and the member on the support.

9. The invention defined in claim 8, further characterized in that: the means effective to change and restore the normal bowed condition of the spring is a cam controlled by the pivoted member and having varying effectiveness on the spring as said member is pivoted.

10. The invention defined in claim 9, further characterized in that: the cam is a rigid part of the pivoted member and is engageable with portions of the spring intermediate the aperture and each end portion.

EDWARD H. FLETCHER.

REFERENCES CITED

The following references are of record in the file of this patent:

UNITED STATES PATENTS

| Number | Name | Date |
|---|---|---|
| 373,292 | Jacobson | Nov. 15, 1887 |
| 1,534,173 | Fogelberg | Apr. 21, 1925 |
| 1,896,687 | Johnson | Feb. 7, 1933 |
| 2,036,953 | Morris | Apr. 7, 1936 |